United States Patent
Thompson et al.

(10) Patent No.: US 9,791,563 B1
(45) Date of Patent: Oct. 17, 2017

(54) JOINT SYNTHETIC APERTURE RADAR PLUS GROUND MOVING TARGET INDICATOR FROM SINGLE-CHANNEL RADAR USING COMPRESSIVE SENSING

(71) Applicant: National Technology & Engineering Solutions of Sandia, LLC, Albuquerque, NM (US)

(72) Inventors: Douglas Thompson, Albuquerque, NM (US); Aaron Hallquist, Albuquerque, NM (US); Hyrum Anderson, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 410 days.

(21) Appl. No.: 14/591,519

(22) Filed: Jan. 7, 2015

Related U.S. Application Data

(60) Provisional application No. 61/925,064, filed on Jan. 8, 2014.

(51) Int. Cl.
*G01S 13/90* (2006.01)
*G01S 13/52* (2006.01)

(52) U.S. Cl.
CPC .......... *G01S 13/9029* (2013.01); *G01S 13/52* (2013.01)

(58) Field of Classification Search
CPC .............................. G01S 13/9029; G01S 13/52
(Continued)

(56) References Cited

U.S. PATENT DOCUMENTS

| 7,498,968 | B1 * | 3/2009 | Bielek | G01S 13/9029 |
| | | | | 342/160 |
| 2010/0245162 | A1 * | 9/2010 | Krikorian | G01S 7/28 |
| | | | | 342/202 |

(Continued)

OTHER PUBLICATIONS

D. Cristallini and I. Walterscheid, "SAR-GMTI enhanced with simultaneous monostatic and bistatic detections," EUSAR 2014; 10th European Conference on Synthetic Aperture Radar, Berlin, Germany, 2014, pp. 1-4.*

(Continued)

*Primary Examiner* — John B Sotomayor
(74) *Attorney, Agent, or Firm* — Medley, Behrens & Lewis, LLC

(57) ABSTRACT

The various embodiments presented herein relate to utilizing an operational single-channel radar to collect and process synthetic aperture radar (SAR) and ground moving target indicator (GMTI) imagery from a same set of radar returns. In an embodiment, data is collected by randomly staggering a slow-time pulse repetition interval (PRI) over a SAR aperture such that a number of transmitted pulses in the SAR aperture is preserved with respect to standard SAR, but many of the pulses are spaced very closely enabling movers (e.g., targets) to be resolved, wherein a relative velocity of the movers places them outside of the SAR ground patch. The various embodiments of image reconstruction can be based on compressed sensing inversion from undersampled data, which can be solved efficiently using such techniques as Bregman iteration. The various embodiments enable high-quality SAR reconstruction, and high-quality GMTI reconstruction from the same set of radar returns.

20 Claims, 8 Drawing Sheets

(58) Field of Classification Search
USPC .............................. 342/25 R, 25 A–25 F, 161
See application file for complete search history.

(56) References Cited

U.S. PATENT DOCUMENTS

| | | | |
|---|---|---|---|
| 2014/0266868 A1* | 9/2014 | Schuman | G01S 13/9029 342/25 B |
| 2014/0313071 A1* | 10/2014 | McCorkle | G01S 7/28 342/202 |
| 2015/0130660 A1* | 5/2015 | Li | G01S 13/9035 342/25 F |
| 2016/0231423 A1* | 8/2016 | Enderli | G01S 13/87 |

OTHER PUBLICATIONS

W. Q. Wang and H. Shao, "Two-Antenna SAR With Waveform Diversity for Ground Moving Target Indication," in IEEE Geoscience and Remote Sensing Letters, vol. 11, No. 12, pp. 2154-2158, Dec. 2014.*

Beaulne, et al., "Preliminary Design of a SAR-GMTI Processing System for RADARSAT-2 MODEX Data", Geoscience and Remote Sensing Symposium, 2003, IGARSS '03, IEEE, vol. 2, pp. 1019-1021.

Doerry, Armin, "Basics of Polar-Format Algorithm for Processing Synthetic Aperture Radar Images", Sandia Report SAND2012-3369, May 2012, pp. 1-66.

Thales, "I-Master GMTI/SAR Radar", Thales Group, Data Sheet, 2012, pp. 1-2.

Beckman, et al., "Comparison of features from SAR and GMTI imagery of ground targets", SPIE International Conference on Algorithms for Synthetic Radar Imagery X, Apr. 2003, pp. 1-9.

Chiu, Shen, "An Analysis of RADARSAT2 SAR-GMTI Performance for Standard Bean Mode", Defence Research Establishment Ottawa, Tech. Report DREO TR 2000-088, Dec. 2000, pp. 1-55.

* cited by examiner

JOINT SYNTHETIC APERTURE RADAR PLUS GROUND MOVING TARGET INDICATOR FROM SINGLE-CHANNEL RADAR USING COMPRESSIVE SENSING

RELATED APPLICATION

This application claims priority to U.S. Provisional Patent Application No. 61/925,064, filed on Jan. 8, 2014, and entitled "JOINT SYNTHETIC APERTURE RADAR+ GROUND MOVING TARGET INDICATOR FROM SINGLE-CHANNEL RADAR USING COMPRESSED SENSING", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Conventional technologies for generating an image (e.g., a synthetic aperture radar (SAR) image) from a radar system involve transmitting and receiving radar pulses at regular intervals. However, a pulse repetition frequency (PRF) utilized in conventional SAR imaging may be too slow to detect objects (targets) moving at relatively modest speeds towards or away from the radar system. Hence, the ability to conduct SAR imaging requires a SAR imaging system operating with a particular PRF, while the ability to also conduct ground moving target indication (GMTI) in a scene co-illuminated by the SAR imaging system requires an imaging system operating with a different GMTI-based PRF.

SUMMARY

The following is a brief summary of subject matter that is described in greater detail herein. This summary is not intended to be limiting as to the scope of the claims.

Various embodiments presented herein relate to utilizing a single-channel radar system configured to generate radar signals (chirps, pulses) having respective timings amenable to both synthetic aperture radar (SAR) and ground moving target indication (GMTI) imagery, and further, generate SAR images and GMTI images from the same set of radar returns (e.g., echo pulses). In an embodiment, data is collected by staggering a slow-time pulse repetition interval (PRI) over the SAR.

For example, rather than transmitting chirps at a regular PRI as in SAR, the "logical" PRI is increased by a factor of n. In an exemplary embodiment where n=4, during each SAR PRI a radar chirp can be transmitted at 4 different times (slices) within a duration of the SAR PRI; accordingly, transmission of the radar chirp has a probability ¼. The effect is that the number of transmitted pulses in the synthetic aperture is preserved with respect to standard SAR PRI, but many of those pulses can be closely-spaced at PRI/n, which enables the ability to resolve objects moving at velocities that place the objects outside of the SAR ground patch.

SAR and GMTI image products are produced through separate processing on the same set of collected data. The image reconstruction methods can be based on compressed sensing inversion from undersampled data, which can be solved utilizing such techniques as a Bregman iteration. The various embodiments enable SAR reconstruction and GMTI reconstruction from the same set of radar returns.

Hence, a few radar pulses can be utilized to achieve both image formation and target detection. Conventional SAR imaging is performed with low repetition frequencies, while conventional GMTI mover detection is performed at high repetition frequencies. With the various embodiments herein, both SAR imaging and GMTI mover detection are conducted by randomly timing transmission of the chirp or pulse, thus enabling both closely- and widely-spaced data. Compared with the conventional approach, the various embodiments described herein enable lower system power, lower bandwidth to transmit to ground, and the effective capability of two different radar types (SAR and GMTI) to be combined into a single radar system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
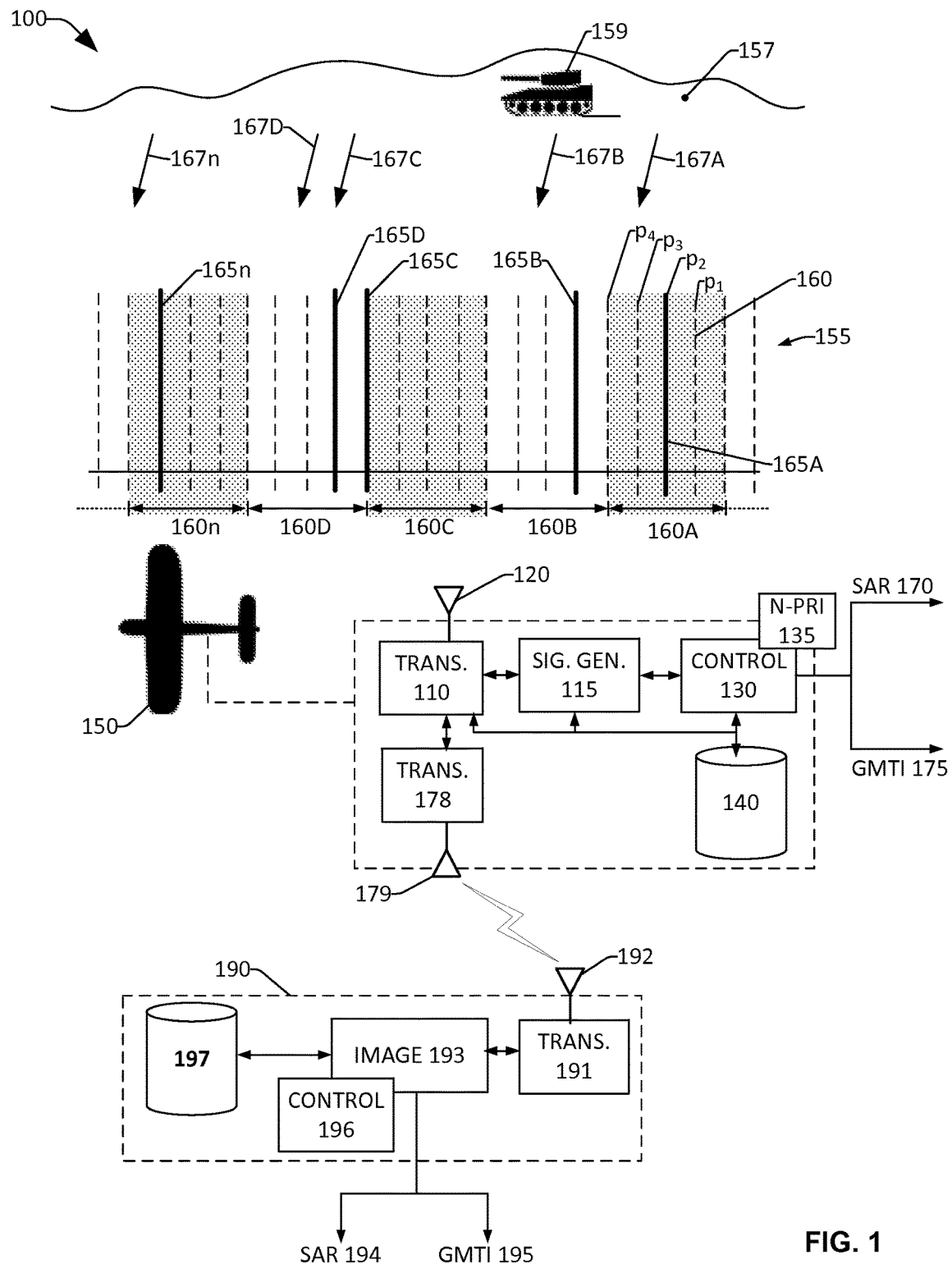
FIG. 1 illustrates a radar system where SAR imaging and GMTI imaging can be performed on commonly transmitted and received radar pulses and returns, in accordance with an embodiment.

Various technologies pertaining to combining two different radar applications (e.g., synthetic aperture radar (SAR) and ground moving target indication (GMTI)) into a single radar system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

Various embodiments presented herein relate to utilizing radar (e.g., a single-channel radar) to collect and process data to enable SAR imagery generation and GMTI imagery generation from a same set (e.g., a common set) of radar returns. In an embodiment, compressive sensing sampling and reconstruction techniques can be utilized to process the radar data. In a further embodiment, the radar data can be generated by randomly staggering a slow-time pulse repetition interval (PRI) (e.g., a reciprocal of a pulse repetition frequency (PRF)) over a radar aperture (e.g., SAR) so that a number of transmitted pulses in the synthetic aperture is preserved with respect to a standard SAR PRF (e.g., an average SAR PRF periodicity is maintained), but a number of the pulses, in the randomly staggered set of pulses, can be closely spaced. The close spacing of the randomly staggered pulses can enable resolution of a moving target (object, vehicle, etc.), wherein a relative velocity of the target can place the target outside of the SAR ground patch, e.g., the moving target has a higher magnitude of Doppler shift than a Doppler shift of the ground being scanned by the radar. The PRI is also known as a pulse repetition time (PRT), or an inter-pulse period (IPP), which, for a transmission cycle having a regular frequency, the PRI is the elapsed time from the beginning of one pulse to the beginning of the next pulse.

A faster logical chirp rate can be used to simulate jitter on a uniformly sampled system and accomplish GMTI mode. Rather than transmitting chirps at a regular PRI, as in conventional SAR, a "logical" PRI can be increased by a factor of n, where n is a positive integer. A SAR PRI modified with the n-factor is termed an n-PRI herein. In an example where a SAR PRF has a periodicity of x, each n-PRI can have a periodicity (duration) of x/n. Hence, in an example setting of n=4, at this increased example interval, a radar chirp is only transmitted with a probability of ¼ from the available increased number n of possible chirp transmission timings for a given SAR PRF periodicity.

Further, every pulse can be transmitted at the increased PRF (e.g., for every transmission generated by the n-factor), but the pulses can be pre-summed about a temporal center determined from randomly selected temporal positions (e.g., with randomly-selected window sizes). This can result in creating randomly staggered SAR data as described above, but can also increase the amount of transmit power deposited on the scene while maintaining signal-to-noise ratio (SNR).

The embodiments can result in a number of return pulses (e.g., echoes, reflections) received at the synthetic aperture being preserved (on average) with respect to a standard SAR, but many of the pulses are closely spaced relative to the standard SAR PRI (e.g., where n=4, pulse reception can be ¼ duration of the standard SAR PRI), which enables resolution of one or more targets whose velocities place the one or more targets outside of the SAR ground patch. As further described herein, both SAR and GMTI images can be resolved from the same data received at a common system (e.g., return pulses received at the same antenna).

The various embodiments presented herein are based upon a combination of SAR imaging and compressed sensing technology. To facilitate understanding of the various embodiments, an overview of SAR and compressed sensing technology is now provided. As further described herein, the processing of the received pulses can be processed by an image generation system (e.g., image processor 193 presented in FIG. 1).

Synthetic Aperture Radar

SAR is a radar image forming strategy capable of producing high-resolution images by synthesizing a large collection aperture from many spatially-distributed measurements of a (traditionally) static scene. The basic operation of a SAR system is as follows. As the radar platform traverses a known path, it transmits pulses (chirps), at equally-spaced time intervals. Energy reflected from the scene at any instant in time can be modeled as a convolution of a pulse waveform in combination with a reflectivity function of the scene.

Pulses collected over the entire synthetic aperture are passed to an imaging system (e.g., comprising an image formation processor), which can generate an image (e.g., a SAR image) that is a two-dimensional mapping of an illuminated scene.

A plurality of techniques are available to form an image from SAR data. A polar format algorithm (PFA) can be utilized to interpolate phase history samples (e.g., in a polar or keystone layout) to a rectangular grid, making the transformation to a reflectivity image a simple Fourier transform. While the PFA processing can be very efficient, it may require that any collected phase histories lie on a regular grid in k-space, hence the need for an interpolation operation.

Compressed Sensing (CS) Theory

CS theory (also referred to as compressive sensing, compressive sampling, or sparse sampling) is based on a concept of a number M of non-adaptive linear "measurements" of a compressible image containing sufficient information to enable recovery of an image, where the image comprises a total of N pixels, and M is less than N, wherein M can be <<N. This is possible because the image contains only K<M<<N significant coefficients (or degrees of freedom) when represented in an appropriate basis: the image can be confined to (or near) a K-dimensional manifold embedded in a large ambient space of N dimensions.

In CS, a measurement vector y is acquired according to the linear model y=Ax+n, where A is an M×N matrix (e.g., M measurements of an N pixel image) that can be decomposed into A=φP, where φ represents the measurements employed by a system, ψ is a compression basis or dictionary suitable to the domain (e.g., such as a Haar wavelet basis), ψx is the image decomposed into a vector x with only K significant coefficients, and n is additive noise (e.g., applicable to SAR imaging, but can be equal to zero for asymmetric compression and/or decompression). The measurements can be non-adaptive, in that A does not depend on x.

Since M<<N, the transformation from x to y is a dimensionality reduction, or compression, that, in general, loses information. However, since only K elements of x are nonzero, recovering x from (noiseless) measurements y can possibly be achieved through a combinatoric (e.g., a non-deterministic polynomial-time (NP)-hard combinatoric)

search for the support of x using only M≥2K appropriately defined measurements. If x is a vector with only K nonzero elements, then x can be resolved per solution of the non-convex problem presented in Eqn. 1:

$$\min_x \|x\|_0 \text{ s.t. } Ax = y,\qquad \text{Eqn. 1}$$

where $\|x\|_0$ counts the number of nonzero elements in x. However, resolution of Eqn. 1 can be computationally intractable even for very small N.

Fundamental to CS theory is that if A is properly designed with M≥0 (K log N/K) measurements, stable recovery can be guaranteed through basis pursuit, a computationally tractable $l_1$ inverse problem that is essentially a convex relaxation of the combinatoric search. Basis pursuit for noiseless measurement enables resolution, per Eqn. 2:

$$\min_x \|x\|_1 \text{ subject to } Ax = y,\qquad \text{Eqn. 2}$$

where $\|x\|_1 = \Sigma_{i=1}^N |x_i|$, and the constraint is replaced by $\|Ax-y\|_2^2 \leq \epsilon^2$ for noisy measurements. Efficient methods exist to solve basis pursuit in polynomial time.

Turning to FIG. 1, a radar system 100 is presented which can be utilized to derive SAR imagery and GMTI information from commonly sourced data. System 100 comprises a transceiver 110, which is configured to transmit and/or receive radar signals via one or more antennas 120 (e.g., a single antenna, a plurality of antennas, an antenna array, etc.). A signal generator component 115 generates the signals (e.g., pulses, chirps, etc.), wherein a controller 130 (e.g., a processor) can be configured to control generation of the signals by the signal generator component 115 and/or transmission of signals from transceiver 110, wherein the signals can be transmitted in accordance with the previously mentioned PRI operating in conjunction with a factor n, e.g., a n-PRI 135. The n-PRI 135 can be an algorithm, a previously defined series of values (e.g., a sequence of defined values), etc. Further, the n-factor can be of any suitable value. For example, the n-factor can be a value that increases the PRI, such that possible instances at which a signal can be transmitted are increased, as further described herein. Hence, where a standard PRF for SAR may have a PRI of 1, in an embodiment where n=4, each n-PRI is ¼ of the standard SAR PRI. Furthermore, the n-factor can have a value that decreases (e.g., slightly) an overall PRI rate such that a greater number of instances at which a signal can be transmitted are increased, but the overall frequency with which a series of signals are transmitted is reduced in comparison with a conventional PRI rate. A data store 140 stores the n-PRI 135, as well as any other suitable data.

The system 100 can be located on any suitable machine, device, etc., such as an aircraft 150. The aircraft 150 can be flying in straight and level flight, wherein a plurality of signals 155 are being transmitted by the radar system 100 towards a scene 157, which can comprise a moving target 159. As shown, the signals 155 can comprise a plurality of possible signal transmission positions, which continuing the above example of n-PRI=4, the plurality of possible signal transmission positions=$p_1$-$p_4$ for a particular SAR PRF periodicity (duration), wherein each group of possible signal transmission positions for a given PRF are collected into groups 160A-160n, wherein a duration between each respective group can be considered to be the SAR PRF periodicity.

Each group 160A-160n can be a time window in which a signal is to be transmitted, wherein adjacent groups (e.g., 160A and 160B, 160B and 160C, etc.) do not overlap. For each particular grouped sequence of possible signal transmission positions 160A-160n, a signal 165 (e.g., respective signals 165A-165n) is transmitted. Hence, continuing the previously presented example of n-PRI=4, out of a possible 4 transmission positions 160, a signal 165 (e.g., any of signals 165A-E) is transmitted. The signal 165 can be transmitted at any of the n-positions (e.g., any of $p_1$-$p_4$).

Thus, as shown, during the first group of possible transmission positions in timing window 160A, a first signal 165A is transmitted at the second transmission position (e.g., $p_2$), while for the second group of possible transmission positions in timing window 160B a second signal 165B is transmitted at the first transmission position (e.g., $p_1$), for the third group of possible transmission positions in timing window 160C a third signal 165C is transmitted at the fourth transmission position (e.g., $p_4$), for the fourth group of possible transmission positions in timing window 160D a fourth signal 165D is transmitted at the first transmission position (e.g., $p_1$), for the fifth group of possible transmission positions in timing window 160E a fifth signal 165E is transmitted at the third transmission position (e.g., $p_3$), etc. Hence, the sequence of pulse transmission is 2, 1, 4, 1, 3 respectively for signals 165A-E. The groups of possible signal transmission positions 160A-160n can be extended to form a transmission sequence comprising n-signal transmissions. For any non-selected n-position, no signal transmission occurs. For example, in timing window 160A, no signaling occurs at $p_1$, $p_3$ and $p_4$.

Per typical radar operation, a plurality of echoes 167A-167n can be received at the antenna 120, wherein the echoes are reflected from the ground and/or the target. The echoes 167A-167n can be processed at the controller 130, wherein the echoes 167A-167n can be processed in accordance with the signaling sequence defined in the n-PRI 135. Based upon the echoes 167A-167n (e.g., phase shift, Doppler shift, etc.), a SAR image 170 can be generated in conjunction with a GMTI image 175.

In FIG. 1, a correlation is made between each echo 167A-167n and each transmitted signal 165A-165n. Accordingly, signal 165A relates to echo 167A, signal 165B relates to echo 167B, etc. Hence, a first duration between signal 165A and 165B is equivalent to a duration of 3 instances of a possible signal transmission. A second duration between signals 165B and 165C is equivalent to a duration of 7 instances of possible signal transmission. A third duration between signals 165C and 165D is equivalent to a duration of 1 instance of possible signal transmission. A fourth duration between signals 165D and 165n is equivalent to a duration of 6 instances of possible signal transmissions. Therefore, as the signaling sequence continues, the average duration between a first signal and a second signal will average to the SAR PRF. However, as mentioned, the SAR PRF has a frequency that is insufficient to resolve moving objects. But, when particular instances between a signal and a subsequent signal are reviewed, then GMTI imaging becomes possible, for example, the duration between signals 165C and 165D is ¼ duration available with conventional SAR PRF (e.g., 4×SAR PRF), where such an effective reduction in duration between pulses is amenable to GMTI imaging.

Processing to obtain a SAR image 170 and/or a GMTI image 175 can be performed by processing units (including ASICs) located onboard of aircraft 150. Alternatively, the echoes 167A-167n (and any pertinent data) can be stored at the data store 140. The echoes 167A-167n, n-PRI 135, pertinent data, etc., can be offloaded (e.g., transmitted) to a remote processing station, such as a ground based station 190. A second transceiver 178 and an antenna system 179 can be utilized to transmit the echoes 167A-167n, n-PRI 135, pertinent data, etc., to the station 190.

A transceiver 191 and associated antenna 192 can be located at the station 190, wherein the transceiver 191 and the antenna 192 can be configured to receive the information offloaded from the system 100. An image processor 193 can be located at the station 190, wherein the image processor 193 can be configured to process the received information to facilitate formation of a SAR image(s) 194 and GMTI image or information 195. The image processor 193 can operate in conjunction with a controller 196. Any information received at the station 190, as well as generated by the image processor 193 (e.g., SAR image 194, GMTI information 195) can be stored in a data store 197 communicatively coupled to any of the transceiver 191, the image processor 193, and/or the controller 196.

Figure 2:
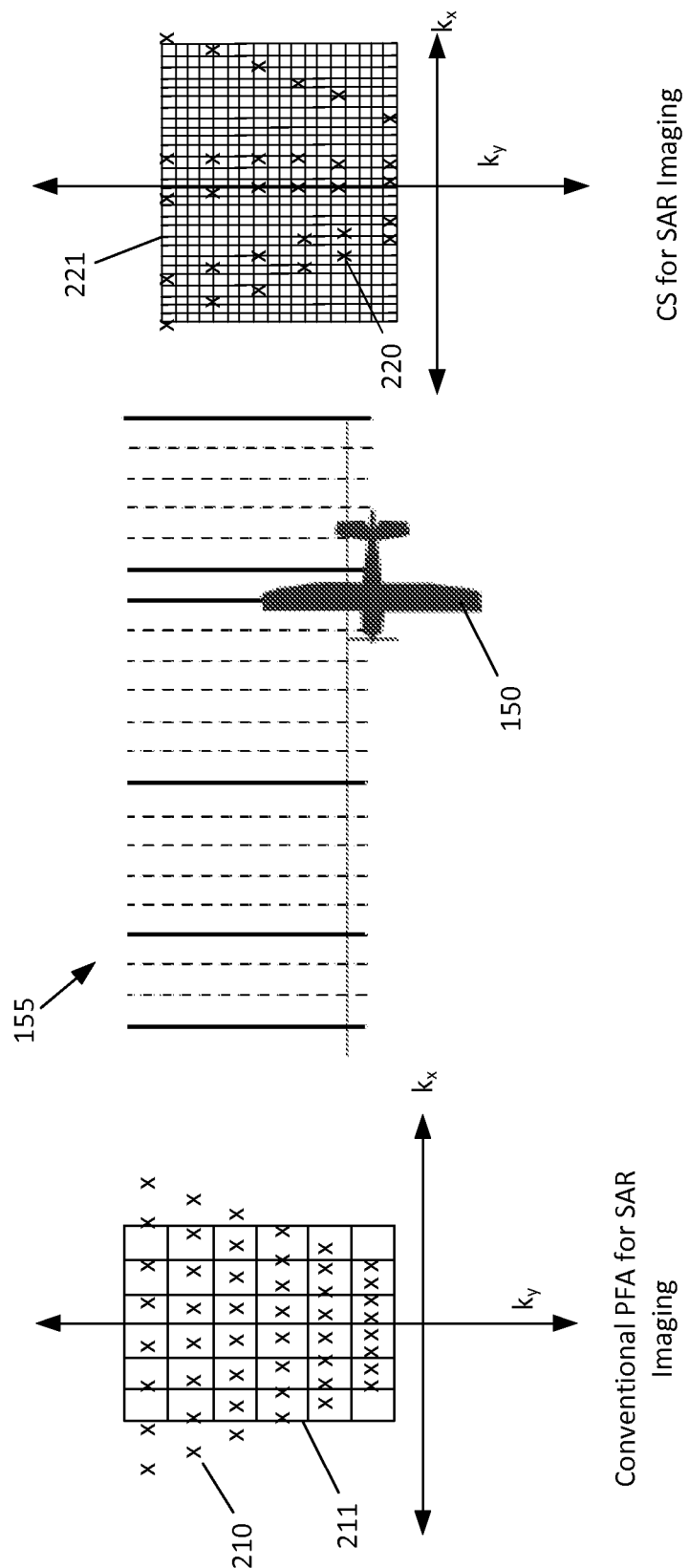
FIG. 2 illustrates a schematic of regularly spaced phase histories for being utilized in a conventional SAR PFA, in conjunction with a process of jittering phase histories and a resulting k-space layout generated from the jittered phase histories.

FIG. 2, schematic 200, is presented to facilitate understanding, wherein on the left hand side of schematic 200 a conventional approach of SAR imaging is presented, while on the right hand side a CS schema for SAR imaging is illustrated. The middle portion illustrates the aircraft 150 in operation with an on-board radar system transmitting signals as described for region 155 of FIG. 1.

As shown, for a conventional system, pulses are regularly transmitted in accordance with a timing defined in a regular PRI, resulting in regularly spaced phase histories 210 overlaying an underlying grid 211.

However, per the various embodiments presented herein, the timing of the respective pulses can be based upon the n-PRI schema, and thus, the resulting phase histories 220 for each radar echo are not regularly spaced, but the phase histories still have to be fitted (e.g., transformed or modified) to fit the underlying grid 221 (e.g., a k-space layout), as further described herein. It is to be noted that to ensure capture and modification of the phase history data 220, the grid 221 comprises of a larger number of cells, but smaller area, compared to grid 211. For example, the number of cells in the grid 221 can be based upon the PRI n-factor, which in the previous example, n=4.

As mentioned, generation of a SAR image (e.g., SAR 170, 194) and/or the GMTI image (e.g., GMTI 175, 195) can require reconstruction of reflectivity of a scene. The following describes an embodiment for such reconstruction, wherein SAR imagery is presented first followed by GMTI imagery, wherein the SAR imagery and the GMTI imagery are derived from commonly collected data.

SAR Image Recovery Algorithm(s)

To reconstruct the scene's reflectivity, a modification of a Polar Format Algorithm (PFA) is required. The PFA enables a balance between fidelity of reconstruction and simplicity of implementation.

Initially the optimization problem is defined. As with most CS problems, this involves minimization of the signal's $L_1$ norm in some domain and is of the form presented in Eqn. 3:

$$\min\|\psi x\|_1 \, s.t. RFx=y, \quad \text{Eqn. 3}$$

where x represents a SAR image and y represents a SAR phase histories. The operator F represents an image-forming 2-D Fourier transform, R is a random slow-time undersampling operator, and ψ is a sparsifying basis. As previously mentioned, the size of measurement y is ideally much smaller than the size of x, i.e. M<<N. An efficient algorithm to solve this optimization problem is described hereafter.

For Compressed Polar Format (CPF), y is chosen to be the jittered phase history measurements in k-space, while x is the scene reflectivity prior to post-processing. In various implementations of CPF, examples of W include:
 ψ=I, which seeks image sparsity
 W=Wavelet transform
 W=DCT transform
 ψ=Block DCT Because each iteration of the algorithm solving the above complex optimization problem can involve at least one large matrix multiplication using F, the efficiency of this step can be improved by transforming the k-space phase history measurements y to a grid to utilize a fast Fourier transform (FFT). In standard PFA, this can be achieved with sinc interpolation in k-space to transform the trapezoid to the grid. Owing to the phase history data, it may not be possible to apply a linear filter. However, the measured phase histories can be embedded on a rectangular grid via a "nearest neighbor" interpolation, placing each data sample on its nearest grid point.

Figure 3:
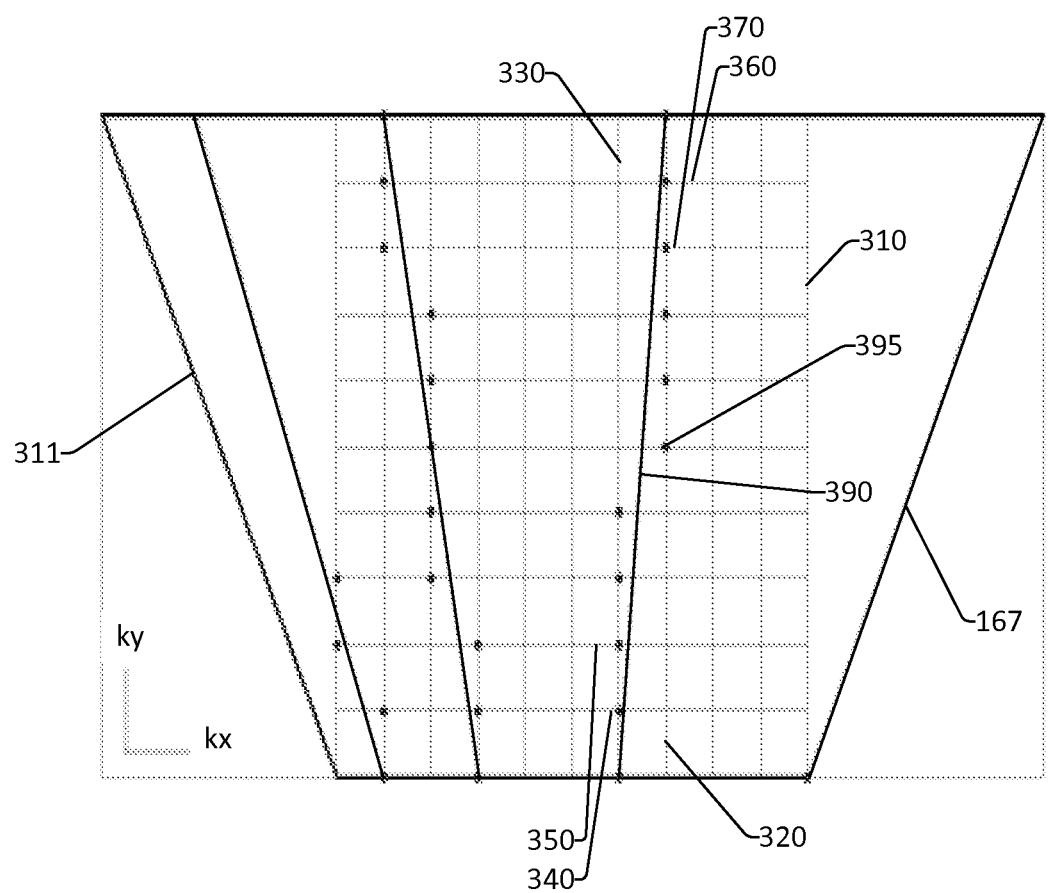
FIG. 3 illustrates a process for embedding a jittered phase history pulse(s) in k-space on a keystone grid.

FIG. 3 illustrates a schematic of a "nearest neighbor" interpolation for embedding a simplified set of jittered phase history samples. Briefly, the embedding process inscribes a rectangle in a trapezoid comprising the jittered phase history samples and attaches the phase history samples to the nearest intersection points on the rectangular grid. A grid 310 (e.g., a rectangular grid, a keystone grid, etc.) can be inscribed within a trapezoid 311, wherein the grid 310 is formed from a plurality of vertical lines (e.g., verticals 320, 330, etc.) and a plurality of horizontal lines (e.g., lines 340, 350, 360, 370, etc.). As shown, for each received echo (e.g., any of echoes 167A-n), data received in the echo can be plotted on the grid 310, wherein, the "nearest neighbor" interpolation enables data from a respective echo to be placed on a grid junction. For example, for echo 390, data is positioned at the intersection of vertical 330 and horizontals 340 and 350, and further the intersection of the vertical 320 and horizontals 360 and 370, amongst other positions. Hence, per the example, by utilizing a "nearest neighbor" interpolation each of the data points 395 respectively located about the echo 390 are plotted as the 11 data points distributed along the verticals 320 and 330. It is to be noted that the embedding process can introduce interpolation errors, however such errors can be minimized by oversampling in azimuth.

With the grid interpolation presented in FIG. 3, the resulting matrix F can be a discrete Fourier transform (DFT) matrix transforming an image to k-space, and so all the necessary pieces are in place for solving the convex optimization problem.

A plurality of sparsity domains can be utilized when processing the "nearest neighbor" interpolation. In an embodiment, successful reconstruction of reflectivity images can be achieved by maximizing sparsity in the image (ψ=I) for the following reasons: (a) brighter reflectors tend to be more faithfully reconstructed; (b) speckle variations in amplitude can be better preserved, especially compared to sparsity domains looking to minimize variation; (c) resolution is preserved and possibly improved, because the algorithm seeks to zero out sidelobes and slow roll-off; and (d) because bright points can be particularly emphasized in $L_1$ reconstruction, phase information can be preserved where it is most important, e.g., well above a noise floor of an image.

$L_1$ minimization can reconstruct both magnitude and phase faithfully in the bright areas, while phase information is completely lost when pixels are zeroed. But, where a reconstruction algorithm places nonzeros, the phase information can be maintained. Hence, it can be concluded that CPF reconstructions of the reflectivity image can be useful when the focus is primarily on bright targets on an unimportant background. This is often of interest in SAR images, and is of particular interest in GMTI imagery.

Figure 4B:
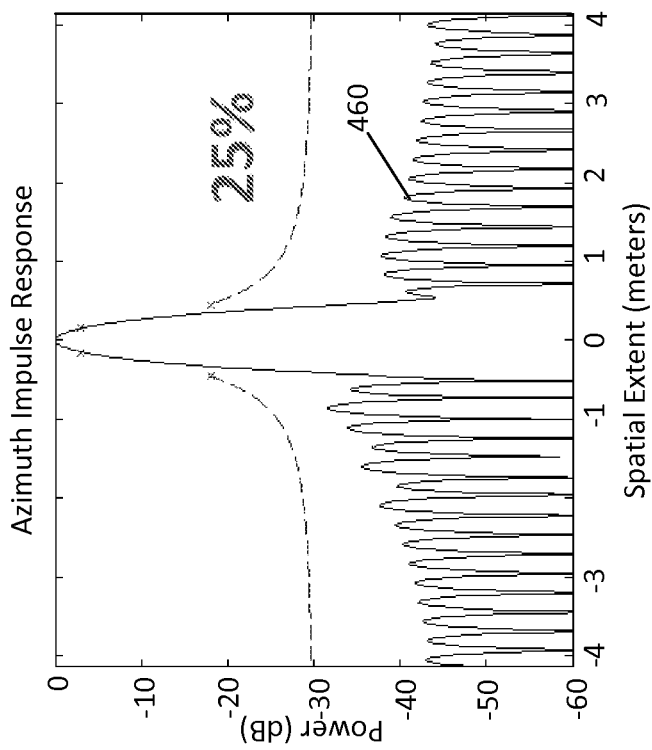
FIG. 4B presents a plot of azimuth impulse response for a CPF reconstruction at 25% of the standard SAR PFA.
Figure 4A:
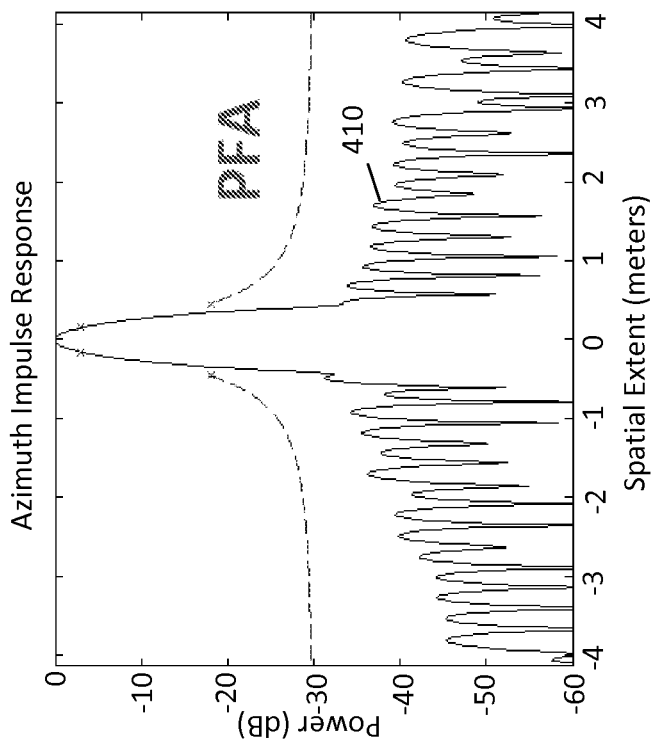
FIG. 4A presents a plot of azimuth impulse response for a conventional SAR PFA condition.

FIGS. 4A-5B present azimuth impulse responses and range impulse responses obtained for both traditional SAR PFA and the n-PRI approach. FIGS. 4A and 4B respectively present plots of power (dB) versus spatial extent (meters), with plot 410 presenting results for a regular PFA condition, while plot 460 presents results for a CPF reconstruction at 25% of the standard data rate (e.g., the SAR PFA data rate). For example, GMTI is normally done at a rate of 12, but owing to the SAR sampling of ¼ GMTI sampling rate of only 3 is utilized. As shown, FIG. 4A has a desired resolution of 0.3048 m, a measured versus desired difference of +2.2%, and a peak sidelobe of −31.2 dB. FIG. 4B presents comparable results with a desired resolution of 0.3048 m, a measured versus desired of −1.3%, and a peak sidelobe of −31.6 dB.

Figure 5A:
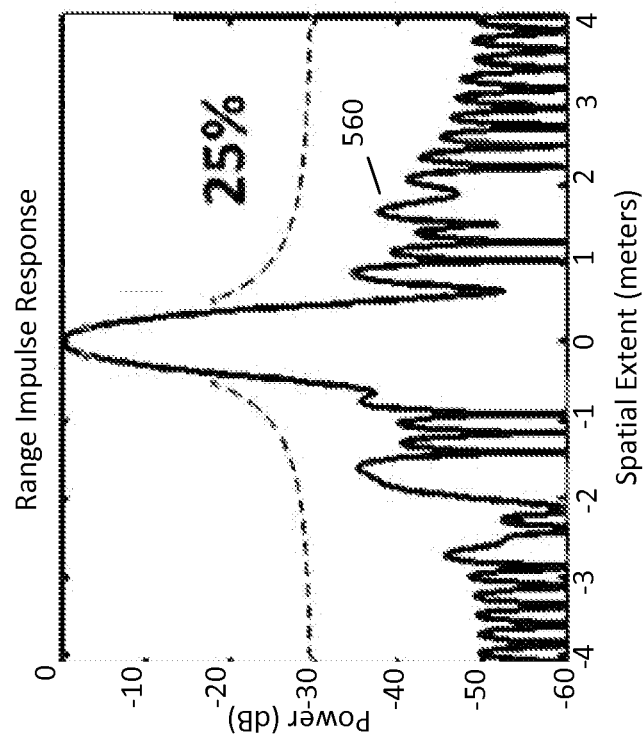
FIG. 5A presents a plot of range impulse response for a conventional SAR PFA condition.
Figure 5B:
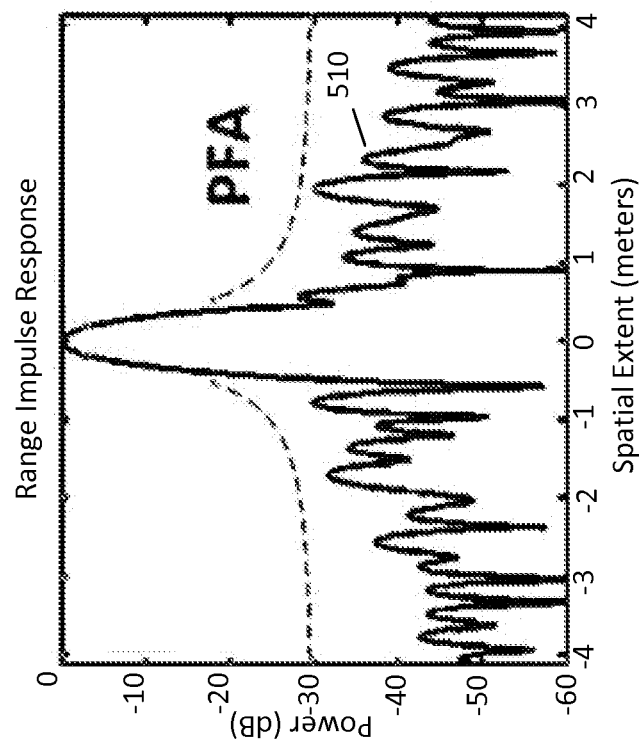
FIG. 5B presents a plot of range impulse response for a CPF reconstruction at 25% of the standard SAR PFA.

FIGS. 5A and 5B respectively present plots of power (dB) versus spatial extent (meters) for range impulse response, with plot 510 presenting results for a regular PFA condition, while plot 560 presents results for a CPF reconstruction at 25% of the standard data rate. As shown, FIG. 5A has a desired resolution of 0.3518 m, a measured versus desired of +1.9%, and a peak sidelobe of −28.2 dB. FIG. 5B presents comparable results with a desired resolution of 0.3518 m, a measured versus desired of −4.4%, and a peak sidelobe of −30.8 dB. Accordingly, FIGS. 4A-5B illustrate the ability to resolve a target (e.g., target 159) is maintained for CPF reconstructions (e.g., FIGS. 4B and 5B) compared with a standard PFA operation (e.g., as shown in FIGS. 4A and 5A).

Compressed Sensing GMTI (CS GMTI)

From the same data as utilized to create the previously described SAR imagery, a number of moving targets in the exoclutter regions forming a GMTI image can be recovered. If the endoclutter (e.g., SAR ground patch) can be filtered out, the remaining GMTI image is highly sparse, with only a few nonzeros (e.g., from moving target 159) on a noise floor background. This makes compressed sensing recovery of GMTI possible, even from a few radar pulses.

In an embodiment, because the image is highly sparse, CS GMTI can be utilized to reduce the number of pulses transmitted and received, reducing size, weight and/or power (SWaP) on a mobile platform. In another embodiment, the same number of pulses can be transmitted, and they can be combined and selected in a manner that reduces an operational overhead associated with the amount of data being worked with. These two embodiments are outlined in the following two subsections.

CS GMTI for Reducing SWaP

One approach to GMTI with CS comprises using a window (e.g., a Hamming window) within the minimization of the signal's $L_1$ norm used for CS. This slightly changes the basis pursuit problem, per Eqn. 4:

$$\min \|Wx\|_1 \text{ subject to } RFx=y, \quad \text{Eqn. 4}$$

where W is a diagonal matrix that defines the window. The window utilized within the basis pursuit can cause the endoclutter within the image to be filtered out, thus allowing energy from any movers (e.g., target 159) to be preserved. The addition of a window within the minimization problem can cause problems for some basis pursuit algorithms such as SPGL1, however, other codes exist, including NESTA, or split Bregman iterations, that can leverage such a formulation.

In an embodiment, it may not be desired to use a window (in diagonal matrix W) that completely zeros out the exoclutter. Zeroing out the exoclutter can create undesirable artifacts in the reconstruction. Instead, per $W=\alpha W_{end}+(1-\alpha)W_{exo}$, where $W_{end}$ and $W_{exo}$ are diagonal matrices that mask the endoclutter and exoclutter regions, respectively. The extent of artifacts depends on the compression ratio, wherein, in an embodiment, values for $\alpha$=about 0.3 can generate reasonable results after pre-processing with the strategy described below.

Prior to reconstructing the GMTI image from undersampled phase histories, y, the undersampled phase histories can be "pre-filtered" to remove a bulk of endoclutter that may be present in the undersampled phase histories. Because the undersampled phase histories no longer lie on a Cartesian grid, this filtering may be imperfect, and leaves a large residual endoclutter signature. Prefiltering can be performed by conducting standard PFA on the undersampled phase histories to produce an image with cross-range artifacts, filtering out the estimated endo-clutter, and subsequently re-synthesizing undersampled phase histories. Undersampled phase histories can be synthesized, e.g., with a DFT, and then zeroing out phase history information where there was no support in the original sampling scheme.

The approach of GMTI modification to CPF can provide images with signatures from movers (e.g., target 159), while filtering most of the endoclutter energy. The slight residual energy left from the filtered endoclutter can cause artifacts to appear throughout the CS reconstructed image. In an exemplary embodiment, a minimum number of pulses required for the CS reconstruction of the GMTI images was about 65% of the SAR rate, which can be due to azimuth ringing from the endoclutter artifacts. Using less than the example 65% of the pulses resulted in amplified azimuth ringing, causing mover signatures to be less prominent within the GMTI image.

CS GMTI for Reducing Data Size

In an embodiment where the phase history pulses are retrieved at the standard GMTI rate, they can be manipulated early on and efficiently to reduce the size of the data worked with. In addition to jittering as in CPF, a local high-pass filter can also be applied to remove endoclutter energy from every jittered phase history. This enables a simple CPF reconstruction, and instead of focusing on the endoclutter, which is now without energy, sparse movers (e.g., target 159) are looked for in the exoclutter. The algorithm for CPF is left unchanged.

Experimentation was performed by filtering the phase histories received prior to jittered sampling, with excellent results at 20%, 10%, and 5% the standard GMTI rate. Because the GMTI images are so sparse, favorable reconstruction performance is achieved even at small fractions of the original GMTI rate.

Efficiently Solving the CS Recovery Problem

Reconstruction of SAR and GMTI images from undersampled phase history data requires a suitable algorithm. For SAR reconstruction, the basis pursuit employed was per Eqn. 5:

$$\min_x \|\psi x\|_1 \text{ subject to } RFx=y, \quad \text{Eqn. 5}$$

where x represents the SAR image and y represents the SAR phase histories. The operator F represents the image-forming 2-D Fourier transform, R is the random slow-time undersampling operator, and $\psi$ is a sparsifying basis.

In typical compressed sensing applications, reconstruction is dominated by matrix multiplies with A and $A^T$. In an embodiment, A=RF, and since both can be implemented very efficiently, the computational and memory burden of reconstruction algorithms is greatly reduced when compared with general compressed sensing problems. Nevertheless, SAR image reconstruction can be challenging owing to following issues: (a) reconstruction algorithms are required to gracefully handle complex data, since both the phase histories and SAR image are complex entities; and (b) SAR images exhibit extremely high dynamic range, so that in the $l_1$ reconstruction framework, care must be taken to ensure that low-magnitude image features are not passed over in favor of only large magnitude scatters.

Good performance for the compressed sensing SAR embodiments presented herein was found (e.g., with no compression, M/N=1) with no compression basis, or $\psi$=I. To improve imager reconstruction quality, traditional basis pursuit can be extended to include a total variation regularization term of the form presented in Eqn. 6:

$$\min_x \|\Psi x\|_1 + \|\nabla x\|_1 \text{ subject to } RFx = y. \quad \text{Eqn. 6}$$

Total variation regularization promotes piece-wise constant solutions to the recovery problem. This tends to smooth reconstruction results. Therefore, an algorithm was derived based on the split-Bregman framework to implement Eqn. 6. In the split-Bregman framework, Eqn. 6 can be recast as an unconstrained problem of the form, per Eqn. 7:

$$\min_x \|\Psi x\|_1 + \|\nabla x\|_1 + \frac{\mu}{2}\|y - RFx\|_2^2. \quad \text{Eqn. 7}$$

A compressed sensing magnetic resonance imaging (MRI) derivation can be utilized, whereby $w=\psi x$, $u=\nabla_u x$ (horizontal gradient), $v=\nabla_v x$ (vertical gradient) and shorthand $\|(u,v)\|_2 = \sum_i \sqrt{|u_i|^2 + |\nabla_i|^2}$. By applying the split Bregman formulation, the problem can be solved iteratively to arbitrary precision. In particular, at the kth iteration, solution can be per Eqn. 8:

$$\min_{x,u,v,w} \|w\|_1 + \|(u, v)\|_2 + \frac{\mu}{2}\|RFx - y\|_2^2 + \frac{\lambda}{2}\|u - \nabla_u x - b_u^k\|_2^2 + \frac{\lambda}{2}\|v - \nabla_v x - b_v^k\|_2^2 + \frac{\gamma}{2}\|w - \Psi x - b_w^k\|_2^2, \quad \text{Eqn. 8}$$

Subsequently, the Bregman parameters $b_u^k$, $b_v^k$ and $b_w^k$ can be updated per Eqns. 9-11:

$$b_u^{k+1} = b_u^k + (\nabla_u x^{k+1} - u^{k+1}) \quad \text{Eqn. 9}$$

$$b_v^{k+1} = b_v^k + (\nabla_v x^{k+1} - v^{k+1}) \quad \text{Eqn. 10}$$

$$b_w^{k+1} = b_w^k + (\psi x^{k+1} - w^{k+1}). \quad \text{Eqn. 11}$$

The "split" Bregman formulation is advantageous in that the $l_1$ and the $l_2$ portions in Eqn. 8 have been decoupled, allowing a simple solution via alternating minimizations. The variables involving $l_1$ norms can be efficiently solved via element-wise shrinkage, per eqns. 12-14:

$$u_i^{k+1} = \frac{\max\left(s_i^k - \frac{1}{\lambda}, 0\right)}{s_i^k}((\nabla_u x^k)_i + b_{u,i}^k) \quad \text{Eqn. 12}$$

$$v_i^{k+1} = \frac{\max\left(s_i^k - \frac{1}{\lambda}, 0\right)}{s_i^k}((\nabla_v x^k)_i + b_{v,i}^k) \quad \text{Eqn. 13}$$

$$w_i^{k+1} = \text{shrink}((\psi x^{k+1}) + b_{w,i}^k, 1/\gamma) \quad \text{Eqn. 14}$$

where, per eqns. 15 and 16:

$$s_i^k = \sqrt{|(\nabla_u x^k)_i + u_i^k|^2 + |(\nabla_v x^k)_i + v_i^k|^2}, \text{ and} \quad \text{Eqn. 15}$$

$$\text{shrink}(x,\rho) = \text{sgn}(x)\max(|x|-\rho,0). \quad \text{Eqn. 16}$$

Solving for $x^{k+1}$ yields, per Eqn. 17:

$$(\mu R^T R - \lambda\Delta + \gamma I)x^{k+1} = \mu F^H R^T y + \lambda\nabla_u^T(u^k - b_u) + \lambda\nabla_v^T(v^k - b_v) + \gamma\psi^H(w^k - b_w) \quad \text{Eqn. 17}$$

where it is assumed that $\psi^H \psi = I$, and $\Delta = -\nabla^T \nabla$ is utilized to represent the discrete Laplacian operator. Since the system is circulant, it diagonalized and solved efficiently using the discrete Fourier transform.

It is to be appreciated that the image processor 193 located at the station 190 can be configured to perform the various processes relating to any of the aforementioned operations relating to any of SAR image formation, CS theory, SAR image recovery, application of CPF, CS GMTI, CS recovery solution, etc., whereby, in an embodiment, the image processor 193 can be operating in conjunction with the controller 196. In another embodiment, an image processor (not shown) on-board the aircraft 150, in conjunction with the controller 130, can be configured to perform the various processes referenced above.

Figure 6:
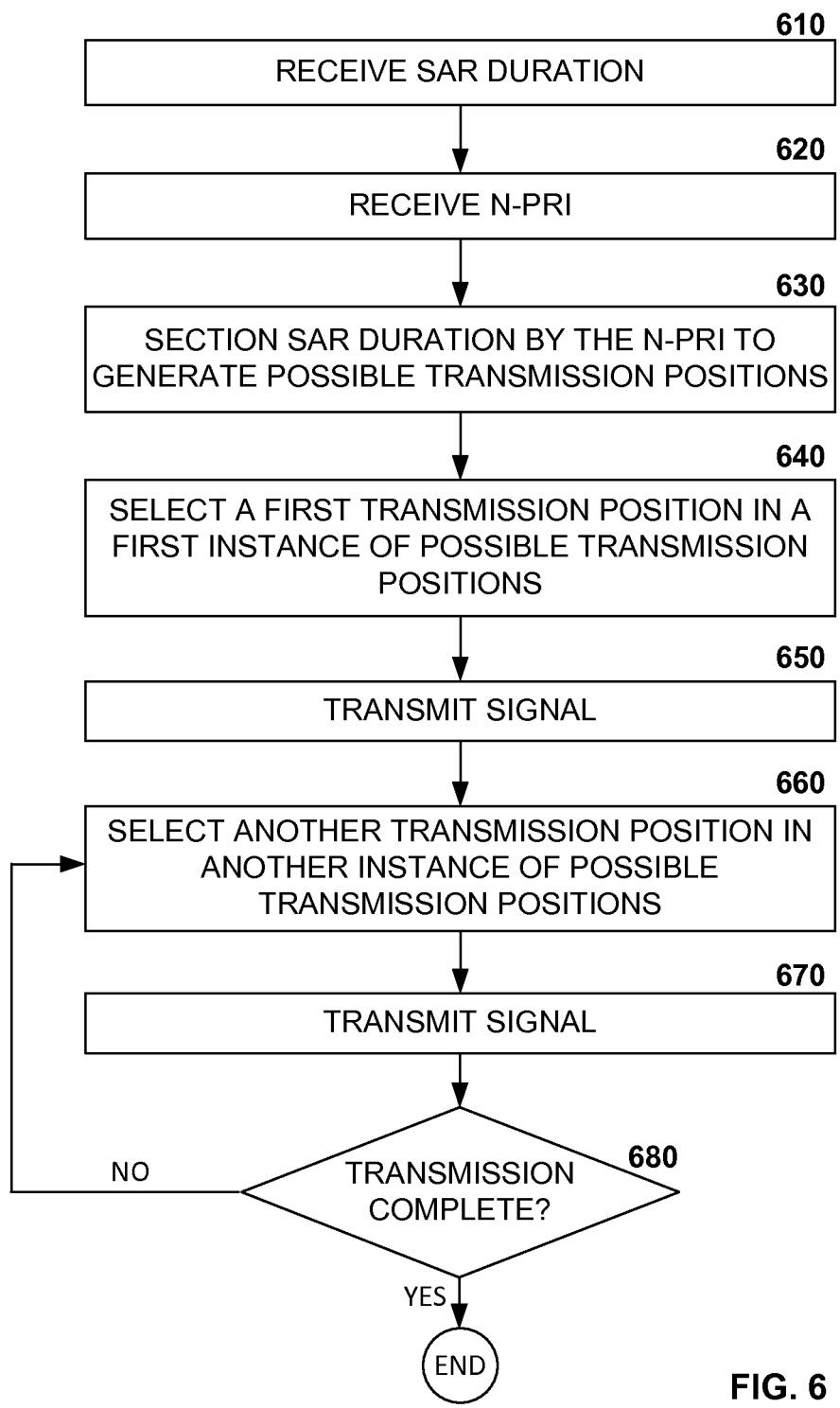
FIG. 6 is a flow diagram for radar signal generation and processing to produce SAR imagery and GMTI imagery from commonly transmitted and received radar pulses.
Figure 7:
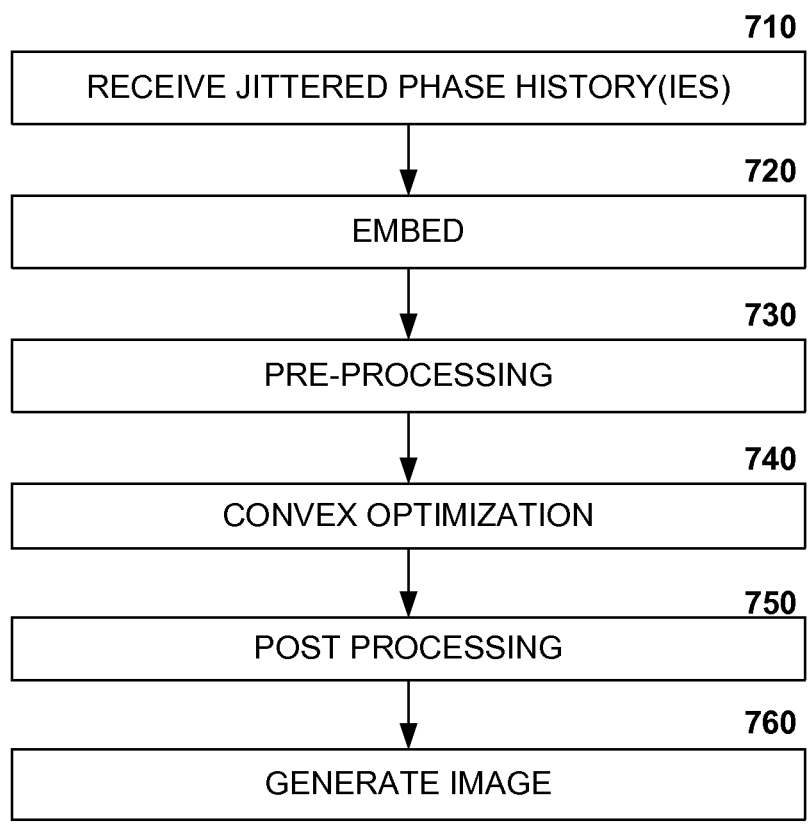
FIG. 7 presents a flow diagram for processing received radar returns to generate SAR imagery and GMTI imagery from commonly transmitted and received radar pulses.

FIGS. 6 and 7 illustrate exemplary methodologies relating to utilizing a single channel of a radar for collecting and processing data to enable SAR and GMTI imagery from the same set of radar returns. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 6 illustrates a methodology 600 relating to collecting and processing data to enable SAR and GMTI imagery from the same set of radar returns at a single-channel radar.

At 610, a duration of transmission for a SAR radar can be received. For example, the duration can be received at a controller which is communicatively coupled and/or controlling a radar system.

At 620, an n-PRI value is received.

At 630, the SAR duration can be divided by the n-PRI value to form a plurality of possible transmission timings which can occur for that SAR duration. For example, if the SAR duration is 12, and the n-PRI value is 4, four possible transmission timings can be generated, a first position=3, a second position=6, a third position=9, and a fourth position=12.

At 640, one of the possible transmission timings is selected. In an embodiment, selection of a transmission timing from the possible transmission timings can be conducted using any suitable selection mechanism, e.g., random, pseudorandom, in accordance with a pre-defined schema, etc.

At 650, a signal can be transmitted based upon the selected transmission timing. For example, in the example SAR duration of 12, the second transmission is selected, and accordingly, a signal transmission is performed at 6. No further transmission occurs during the remainder of the SAR duration, e.g., no transmission occurs at 9 or 12.

At 660, another transmission timing is selected from the possible transmission timings. For example, during this selection iteration, the third transmission timing is selected.

At 670, a signal can be transmitted based upon the selected transmission timing. For example, with the previously selected third transmission, a signal transmission is performed at 9. No further transmission occurs during the remainder of the SAR duration, e.g., no transmission occurs at 12.

At 680, a determination can be made regarding whether the current series of transmissions is complete, e.g., the current SAR mission is complete. In response to a determination YES, transmission of SAR signals is terminated. In response to a determination NO, the flow can return to act 760 to enable a transmission timing to be selected for a subsequent transmission.

FIG. 7 presents a summary of the respective processes which can be performed by an imaging processor, as presented above. At 710, one or more phase histories are generated and/or received at an imaging processor.

At 720, the phase histories can undergo an embedding process at the imaging processor. In an embodiment, a "nearest neighbor" interpolation operation can be performed to embed a set of jittered phase histories. As previously described, a grid can be inscribed within a trapezoid, wherein the trapezoid can equate to a trapezoid formed when a plurality of phase histories are available, per a regular SAR imaging process.

At 730, pre-processing can be performed and can include a k-space modification, such as a Hamming window, to reduce image sidelobes.

At 740, per the operations at 610-630, the k-space representation and modification enables resolution of convex optimization.

At 750, post processing can be performed whereby such post-processing can include one or more image modifications. An example image modification can be antenna beam pattern correction.

At 760, a GMTI image can be generated with one or more movers (e.g., target 159) depicted thereon.

Figure 8:
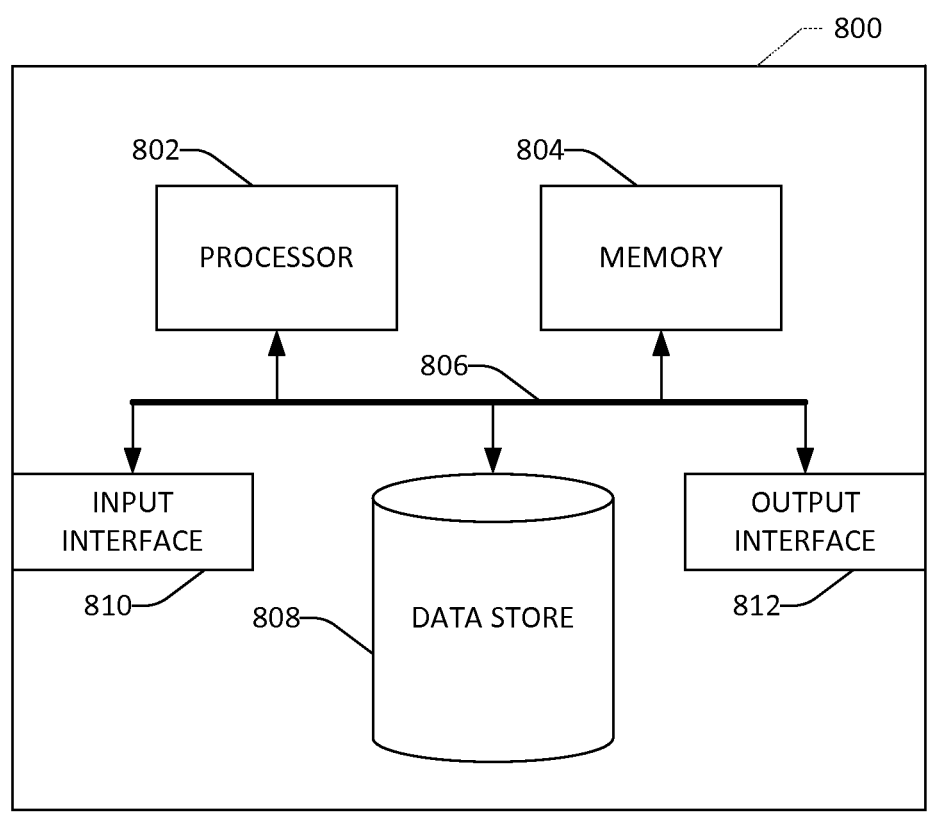
FIG. 8 illustrates an exemplary computing device.

Referring now to FIG. 8, a high-level illustration of an exemplary computing device 800 that can be used in accordance with the systems and methodologies disclosed herein is illustrated. For example, the computing device 800 may be utilized to control transmission of radar pulses to facilitate SAR imaging and GMTI imaging from commonly transmitted and received radar pulses. In another example, the computing device 800 can be utilized to process received data to enable construction of a SAR image and/or a GMTI image. For example, computing device 800 can operate as any of controllers 130, 196, image processor 193, etc. The computing device 800 includes at least one processor 802 that executes instructions that are stored in a memory 804. The instructions may be, for instance, instructions for implementing functionality described as being carried out by one or more components discussed above or instructions for implementing one or more of the methods described above.

The processor 802 may access the memory 804 by way of a system bus 806. In addition to storing executable instructions, the memory 804 may also store operating parameters, required operating parameters, and so forth.

The computing device 800 additionally includes a data store 808 that is accessible by the processor 802 by way of the system bus 806. The data store 808 may include executable instructions, operating parameters, required operating parameters, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
a controller, configured to:
receive a first frequency value, wherein the first frequency value is a frequency for signaling in accordance with a synthetic aperture radar (SAR) imaging schema, a periodicity of the first frequency is a timing window for signal transmission;
receive a second frequency value, wherein the second frequency value is a frequency for signaling in accordance with a ground moving target indication (GMTI) schema;
generate a plurality of possible transmission timings at which a signal is to be transmitted during the timing window, wherein the plurality of possible transmission timings is based upon division of the first frequency value by the second frequency value; and
select, for a first instance of signal transmission, a first transmission timing from the plurality of possible transmission timings; and
a signal generator component configured to:
receive the first transmission timing; and
generate a first signal at the selected first transmission timing.

2. The system of claim 1, further comprising a transceiver configured to transmit the first signal to illuminate a scene, wherein the scene comprises a moving target.

3. The system of claim 2, wherein:
the controller is further configured to select, for a second instance of signal transmission to occur in a second timing window, a second transmission timing from the plurality of possible transmission timings;
the signal generator component is further configured to generate a second signal at the selected second transmission timing; and
the transceiver is further configured to transmit the second signal to further illuminate the scene.

4. The system of claim 3, wherein the transceiver is further configured to:
receive a first reflection from the scene, wherein the first reflection is a reflection of the first signal from the scene; and
receive a second reflection from the scene, wherein the second reflection is a reflection of the second signal transmission from the scene.

5. The system of claim 4, further comprising an image processor, the image processor configured to:
generate, from the first reflection and second reflection, a SAR image and to further generate a GMTI image.

6. The system of claim 5, wherein the image processor is further configured to:
generate a first phase history from the first reflection;
place the first phase history on a SAR grid; and
generate the SAR image from the first phase history.

7. The system of claim 6, wherein the image processor is further configured to:
utilize a nearest neighbor algorithm to place the first phase history on a k-space grid; and
generate the GMTI image from the k-space grid.

8. The system of claim 3, wherein:
the controller is further configured to select, from the plurality of possible transmission timings, a third transmission timing for a third timing window, wherein a first duration between when the first signal and the second signal are transmitted is different than a second duration between when the second signal and a third signal are transmitted; and
the signal generator is further configured to generate the third signal; and
the transceiver further configured to transmit the third signal.

9. The system of claim 1, wherein the system is a single-channel radar system and is located onboard an aircraft.

10. A method performed at a radar system, the method comprising:
receiving, at a controller of the radar system, a first value for a first frequency, wherein the first frequency indicates when a signal is to be transmitted according to a first schema;
receiving, at the controller, a second value for a second frequency, wherein the second frequency indicates when a signal is to be transmitted according to a second schema;
dividing, at the controller, the first value by the second value to generate a plurality of possible transmission timings at which a signal transmission is to occur;
selecting, at the controller, for a first instance of signal transmission, a first transmission timing from the plurality of possible transmission timings; and
transmitting a first signal at the selected first transmission timing, the first signal transmitted from a transceiver of the radar system.

11. The method of claim 10, wherein the first frequency is a frequency utilized for synthetic aperture radar (SAR) imaging.

12. The method of claim 10, wherein the second frequency is a frequency utilized for ground moving target indication (GMTI) imaging.

13. The method of claim 10, further comprising:
selecting, at the controller and for a second instance of signal transmission, a second transmission timing from the plurality of possible transmission timings; and
transmitting a second signal at the selected second transmission timing, the second signal transmitted by the transceiver.

14. The method of claim 13, further comprising:
receiving, at the transceiver, a first reflection from a scene being illuminated by the first signal, wherein the first reflection is a reflection of the first signal from the scene;

receiving, at the transceiver, a second reflection from the scene, wherein the second reflection is a reflection of the second signal transmission; and utilizing the first reflection and second reflection to generate a SAR image and to further generate a GMTI image, wherein the SAR image and the GMTI image is generated by an image processor of the radar system.

15. The method of claim 13, further comprising:

selecting, at the controller and for a third instance of signal transmission, a third transmission timing from the plurality of possible transmission timings; and transmitting a third signal at the selected third transmission timing, wherein the transceiver transmits the third signal.

16. The method of claim 15, wherein a first duration between the first signal transmission and the second signal transmission is different than a second duration between the second signal transmission and the third signal transmission.

17. The method of claim 15, wherein a first duration between the first signal transmission and the second signal transmission is equivalent to a second duration between the second signal transmission and the third signal transmission.

18. The method of claim 17, wherein at least one of the first duration or the second duration can be utilized for generating a GMTI image.

19. A computer-readable storage medium comprising instructions that, when executed by a processor, cause the processor to perform acts comprising:

defining a duration of a time window as being a period of a chirp signal utilized to generate synthetic aperture radar (SAR) images;

for each adjacent and non-overlapping time window in a sequence of time windows:

defining a number of potential time points in the time window as being the frequency of the chirp signal used to generate SAR images divided by the frequency of a chirp signal used to generate ground moving target indication (GMTI) images, wherein each of the potential time points is evenly-spaced throughout the time window with respect to each other; and pseudo-randomly selecting a time point from amongst the potential time points; and transmitting a chirp at the selected time point while refraining from transmitting chirps at any of the other potential time points in the time window.

20. The computer-readable storage medium of claim 19, the acts further comprising:

receiving, for each transmitted chirp, a return echo from a scene; and utilizing the return echo to generate a SAR image and to further generate a GMTI image.

* * * * *